(12) United States Patent
Vasquez-Govea et al.

(10) Patent No.: US 11,086,331 B2
(45) Date of Patent: Aug. 10, 2021

(54) AUTONOMOUSLY GUIDED MACHINE

(71) Applicant: Inria Institut National De Recherche En Informatique Et En Automatique, Le Chesnay (FR)

(72) Inventors: Alejandro Dizan Vasquez-Govea, Palo Alto, CA (US); Jan Michalczyk, Grenoble (FR); Stanislas Borkowski, Brignoud (FR)

(73) Assignee: INRIA INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 256 days.

(21) Appl. No.: 16/309,599

(22) PCT Filed: Jun. 6, 2017

(86) PCT No.: PCT/FR2017/051427
§ 371 (c)(1),
(2) Date: Dec. 13, 2018

(87) PCT Pub. No.: WO2017/216447
PCT Pub. Date: Dec. 21, 2017

(65) Prior Publication Data
US 2019/0332117 A1 Oct. 31, 2019

(30) Foreign Application Priority Data

Jun. 14, 2016 (FR) ...................................... 1655510

(51) Int. Cl.
*G05D 1/02* (2020.01)
*A01B 69/00* (2006.01)
*G06K 9/62* (2006.01)

(52) U.S. Cl.
CPC ......... *G05D 1/0236* (2013.01); *A01B 69/004* (2013.01); *G06K 9/6202* (2013.01); *G05D 2201/0201* (2013.01)

(58) Field of Classification Search
CPC ......... G05D 1/0236; G05D 2201/0201; G05D 1/0248; A01B 69/004; A01B 69/008;
(Continued)

(56) References Cited

U.S. PATENT DOCUMENTS

2007/0046500 A1* 3/2007 Herbert .................. G01S 17/46
340/932.2
2007/0100498 A1* 5/2007 Matsumoto ............ G06N 3/008
700/245

FOREIGN PATENT DOCUMENTS

| ES | 2401509 A1 | 4/2013 |
| GB | 2374228 A | 10/2002 |
| WO | 2014033055 A1 | 3/2014 |

OTHER PUBLICATIONS

Sarkate, Rajesh S., N. V. Kalyankar, and P. B. Khanale. "Application of computer vision and color image segmentation for yield prediction precision." In 2013 International Conference on Information Systems and Computer Networks, pp. 9-13. IEEE, 2013. (Year: 2013).*

(Continued)

*Primary Examiner* — Thomas G Black
*Assistant Examiner* — Ana D Thomas
(74) *Attorney, Agent, or Firm* — Maynard, Cooper & Gale, P.C.; Brian Sattizahn (57) ABSTRACT

The invention relates to an autonomously guided machine (10) comprising at least a steering body and a steering mechanism (13), said machine also comprising: a guide system (11) including an optical filter (17) which has a receiving surface exposed to the exterior and which can transmit light rays directed substantially in one direction and (Continued)

eliminate other light rays; a screen (18) that receives the filtered light; a digital camera (19) for capturing pixel resolution images of the screen (18); a pre-processing element for selecting the pixels corresponding to an incident planar laser beam received by the guide system (11), and filtered and projected onto the screen (18), and for generating a response detection image; a line generator for generating an estimate J of the coordinates of the detected lines based on the response detection image, involving the processing of the pixel columns pixels; and a locator which receives the estimate of the coordinates of the detected lines and calculates values representative of pixel columns based on said estimate and on parameters of the guide system (11), and subsequently calculates a distance $y_w$ from the guide system (11) to the planar laser beam in order to control the steering mechanism (13) so as to minimise this distance $y_w$.

10 Claims, 7 Drawing Sheets

(58) Field of Classification Search
CPC ....... G06K 9/6202; G01S 3/784; G01S 3/786; G01S 5/16
See application file for complete search history.

(56) References Cited

OTHER PUBLICATIONS

Subramanian, Vijay, Thomas F. Burks, and A. A. Arroyo. "Development of machine vision and laser radar based autonomous vehicle guidance systems for citrus grove navigation." Computers and electronics in agriculture 53.2 (2006): 130-143. (Year: 2006).*
Mesko, et al., "Laser Spot Detection," Journal of Information, Control and Management Systems, Jan. 2013, pp. 35-42.
Molder, et al., "Laser Line Detection with Sub-Pixel Accuracy," Elektronika ir Electrotechnika—Electronics and Electrical Engineering, vol. 20, No. 5, May 2014.

\* cited by examiner

AUTONOMOUSLY GUIDED MACHINE

BACKGROUND OF THE INVENTION

The invention relates to the field of machines, notably agricultural machines, and more specifically truck farming or horticultural machines.

Mechanized truck farming or horticulture usually requires a machine driver and one or more operators stationed at the rear to carry out the truck farming work such as planting, cutting, transplanting, pruning, harvesting, and the like. The operators sit or lie on the machine itself or on a support carried or towed by the machine, the whole assembly forming an operational truck farming machine. The speed of advance of the machine is very low. Other work is done by an implement towed by the machine, with a driver alone.

The driver's work requires constant care in order to avoid damage to the crops arranged in parallel rows. Furthermore, driving on cultivated ground, which is naturally irregular, transmits vibrations and jolts, which are injurious to health, to the driver.

To increase the accuracy of driving and reduce production costs, a change to autonomous guidance of the machine is required.

BRIEF SUMMARY OF THE INVENTION

The present invention is designed to improve the situation regarding precision machines, notably agricultural machines. An autonomously guided machine comprises at least one steering member and a steering mechanism. The autonomously guided machine comprises a guidance system comprising an optical filter which has a receiving face exposed to the exterior and which can transmit light rays directed substantially in one direction and eliminate other light rays; a screen receiving the filtered light; a digital camera for capturing images resolved into pixels of said screen; a pre-processing member that can select the pixels corresponding to an incident plane laser beam received by the guidance system, filtered and projected onto said screen, and can generate a detection response image; a line detector generating, on the basis of the detection response image, by processing on the columns of pixels, an estimate J of the coordinates of the detected lines; and a locator that receives the estimate of the coordinates of the detected lines and calculates values representative of columns of pixels on the basis of said estimate of the coordinates of the detected lines and of parameters of the guidance system, and then calculates a distance $y_w$ of the guidance system from the plane laser beam in order to control the steering mechanism so as to minimize said distance $y_w$.

As a result of the invention, the machine is re-centered on its ideal trajectory without a driver. This makes it possible to achieve an accuracy of about 0.5 per 1000, in other words 5 cm in 100 meters; that is to say, the machine is able to keep to a deviation of 5 cm or less from the ideal position at a distance of 100 m from the source of the laser beam, the angular deviation remaining substantially constant with distance. The deviation is reduced, leading to greater accuracy of operation and reduced crop losses.

In one embodiment, the optical filter comprises a honeycomb structure with through cells, for transmitting the light rays along the axis of the through cells. The optical filter has a robust structure.

The term "semi-opaque screen" is taken to mean a screen arranged so as to allow a part of the light to pass through, while enabling another part of the light to be intercepted at the intersection of said screen and the laser beam.

In one embodiment, the detection response image is single-channel, and each pixel of said detection response image has a value which is a function of the probability that said pixel does or does not belong to the line of the laser beam. The detection response image is compact in terms of data volume.

In one embodiment, the pre-processing member comprises a red-green-blue primary colors to hue-saturation-value (HSV) converter, which converts each pixel of the camera output image into a pixel of an HSV image, an equalizer for each of the saturation and value channels of the HSV image, and a calculator of an exponential function of the weighted Euclidian distance between an HSV pixel and a reference pixel:

$$O_{i,j}=e^{-(w_H(I^H_{i,j}-L^H)^2+w_S(I^S_{i,j}-L^S)^2+w_V(I^V_{i,j}-L^V)^2)}$$

where $O_{i,j}$ is the value of the pixel having coordinates i and j of the single-channel image forming the pre-processing output; $w_H$, $w_S$, $w_V$ are the weightings for the channels H, S, V; $I^H_{i,j}$, $I^S_{i,j}$, $I^V_{i,j}$ is the value of the input pixel in each channel; and $L^H$, $L^S$, $L^V$ is the value of the reference pixel in each canal.

The pre-processing is fast.

The red-green-blue primary colors to hue-saturation-value (HSV) converter makes the identification of the color easier.

In one embodiment, the line detector comprises:

a column adder which adds up the pixels of each column of said detection response image to obtain a column parameter $C_j=\Sigma_i O_{i,j}$;

a high-pass filter eliminating the columns whose parameter is less than the product $\tau C_{max}$ of the maximum $C_{max}$ of said column parameters $C_j$ and a chosen filter coefficient $\tau$, to select the relevant columns; and a weighting member which finds the ratio of the sum of the relevant column parameters $C_j$, weighted by their index j in the camera output image, to the sum of relevant column parameters $C_j$, yielding a column index value J which estimates the coordinates of the incident plane laser beam in the camera output image: $J=\Sigma_j jC_j/\Sigma_j C_j$.

The line detector generates a highly representative column index.

The filter coefficient $\tau$ may be constant.

In one embodiment, the locator comprises a calculator of the distance $y_w$ of the guidance system from the plane laser beam as a function of the estimate J of the coordinates of the detected lines, of a parameter m of distance between the screen and the optical filter, and of a screen centering parameter b, where $y_w=mJ+b$. The calculation of the distance $y_w$ is simple.

In one embodiment, the distance parameter is constant. The screen may be stationary relative to the guidance system.

In one embodiment, the screen is plane. The screen is simple and the guidance system is compact.

In one embodiment, the screen is adjacent to the optical filter.

In one embodiment, the screen comprises two parallel parts, spaced apart in the direction of propagation of the incident laser beam, so that the locator calculates an angular deviation $\alpha$ of the guidance system from the plane laser beam in order to control the steering mechanism. The guidance system is differential, providing improved accuracy in terms of distance and making it possible to calculate an angle between the guidance system and the incident beam.

In one embodiment, the locator, after the calculation of the values representative of columns of pixels, calculates the angular deviation α of the guidance system from the plane laser beam in order to control the steering mechanism so as to minimize said distance $y_w$. The convergence of the machine is faster.

In one embodiment, the locator comprises a calculator of the distance $y_w$ of the guidance system from the plane laser beam as a function of the estimate $J_1$ of the coordinates of the detected lines on the first part of the screen, of a parameter $m_1$ of distance between the screen and the optical filter, and of a parameter $b_1$ of the centering of the first part of the screen, where $y_1=m_1J_1+b_1$; of the estimate $J_2$ of the coordinates of the detected lines on the second part of the screen, of a parameter $m_2$ of distance between the second part of the screen and the optical filter, and of a parameter $b_2$ of the centering of the second part of the screen, where $y_2=m_2J_2+b_2$, the distance $y_w$ being the mean of the distances $y_1$ and $y_2$. The calculated distance is accurate.

In one embodiment, the locator comprises a calculator of the angle between the plane of the laser beam and the axis of the guidance system, where $\alpha=\text{Atan } 2(y_2-y_1; x_1+x_2)$, said axis being normal to each part of the screen. After the estimation of the distance and the angle to be reduced to zero, the correction on the steering mechanism is faster.

A machine guidance assembly comprises a movable guidance system and a stationary plane laser beam transmitter. The guidance system comprises an optical filter which has a receiving face exposed to the exterior and which can transmit light rays directed substantially in one direction and eliminate other light rays; a screen receiving the filtered light; a digital camera for capturing images resolved into pixels of said screen; a pre-processing member that can select the pixels corresponding to an incident plane laser beam received by the guidance system, filtered and projected onto said screen, and can generate a detection response image; a line detector generating, on the basis of the detection response image, by processing on the columns of pixels, an estimate J of the coordinates of the detected lines; and a locator that receives the estimate of the coordinates of the detected lines and calculates values representative of columns of pixels on the basis of said estimate of the coordinates of the detected lines and of parameters of the guidance system, and then calculates a distance $y_w$ of the guidance system from the plane laser beam in order to generate a control signal that minimizes said distance $y_w$. The assembly may be adapted to existing agricultural machines.

BRIEF DESCRIPTION OF THE SEVERAL VIEWS OF THE DRAWINGS

Other characteristics and advantages of the invention will be apparent on examination of the following detailed description, and of the attached drawings, in which.

The attached drawings may not only clarify the understanding of the present invention but also contribute to the definition of the invention if necessary.

DETAILED DESCRIPTION OF THE INVENTION

In the course of his research, the Applicant became aware of the unsatisfactory nature of the known devices. GPS has progressively become a major consumer product in its low accuracy versions. Differential GPS requires ground stations and is too costly in the field concerned. Guidance based on a probabilistic model, using a Bayes filter for example, is highly costly in terms of computer resources and requires expensive sensors such as laser distance scanners. It uses sensors specific to the machine concerned, for example wheel encoders, an inertial controller and the like, environmental sensors and a map. Some systems require beacons located in the maneuvering area of the machine. This is hardly suitable for agriculture. Accurate mapping must vary with ice, rain, wind, etc., as well as with the type of crop.

There are guidance systems based on a stationary infrastructure of radar systems or video cameras communicating with the movable machine. Neither the adaptation nor the costs are feasible for agriculture or for other fields with high constraints.

The Applicant has identified certain particularities of agricultural applications, and more particularly truck farming or horticultural applications. The distance to be traveled between two turns of the machine is relatively well known, and it is easy to set an upper limit. The crops are planted in straight lines. Guidance may be considered as aiming to approach a straight line as far as possible. Additionally, since the same guidance system is used for successive cultivation of the same crop, any faults inherent in the guidance system will be repeated, and therefore will have no significant effect.

A guidance system based on following a plane laser beam is proposed. A laser transmitter 100 (see FIG. 2) is positioned at one end of an agricultural plot. The laser transmitter 100 emits a beam in a single plane layer. The beam may or may not consist of visible light. Since a laser is used, the exact wavelength is known. The laser transmitter 100 has a power compatible with the presence of humans, currently equal to 5 mW or less. The divergence is less than or equal to 0.4 mrad, being preferably less than 1 mrad for correct operation in difficult situations, in the direction perpendicular to the plane of the beam. The beam has an aperture angle of between 5° and 60°, preferably between 10° and 20°. Preferably, the plane of the beam is vertical, independently of any inclination of the parcel and/or the machine.

Figure 1:
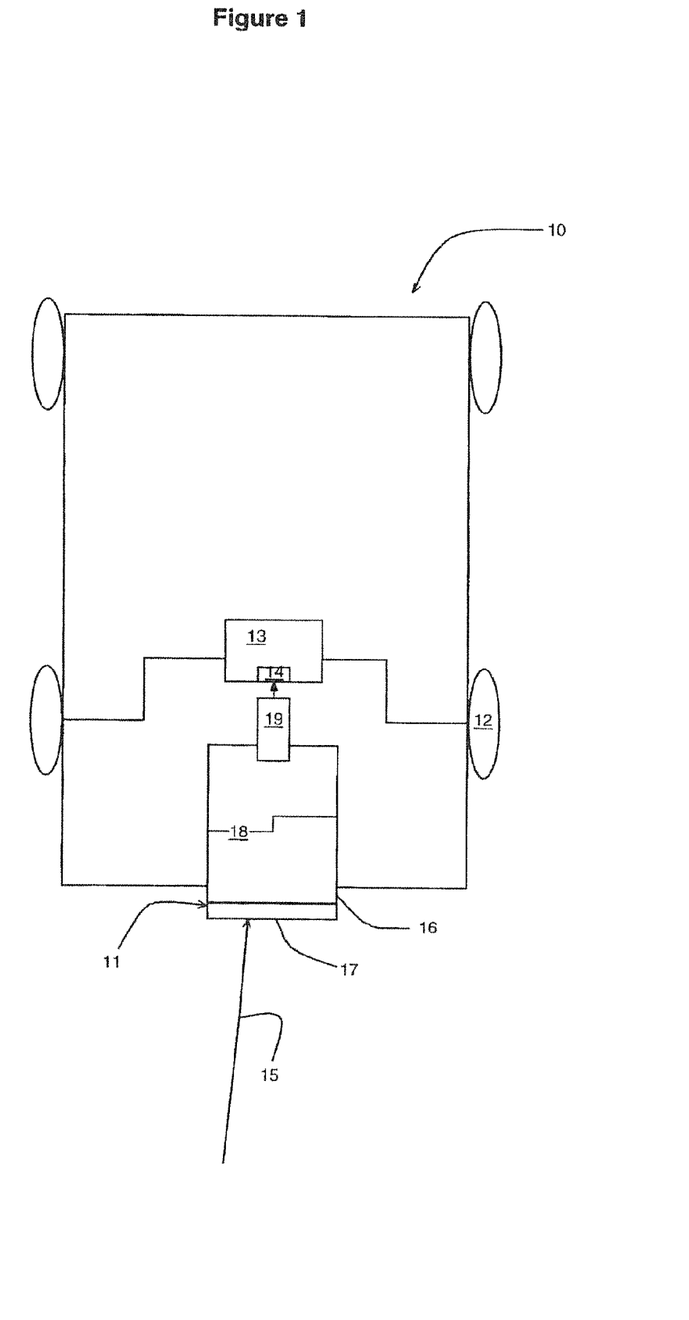
FIG. 1 shows schematically a machine according to the invention.

As shown in FIG. 1, the machine 10 may be a tractor, a self-propelled vehicle, a harvester, or the like. The machine 10 comprises at least one steering member 12, for example a steerable wheel, and a steering mechanism 13. The steering mechanism 13 is hydraulic or electric and is controlled by a control member 14 that can be connected to the guidance system 11. The control member 14 may be of the proportional type, possibly with a small derivative and/or integral component.

The machine 10 is equipped with the guidance system 11. The guidance system 11 is designed to receive the incident laser beam 15. The guidance system 11 is supported at a rear end of the machine 10 to facilitate the initial alignment when the user starts a new line. The guidance system 11 has a free end wall for directly receiving the incident laser beam 15 which is shown as a bold line. The guidance system 11 comprises an opaque casing 16 open at one end, an optical filter 17 mounted at said open end, a screen 18 mounted in the casing 16, and a digital camera 19 mounted in the wall of the casing 16 opposite the optical filter 17. The direction from the open end to the opposite end defines the X axis of the casing 16.

The axis of the casing 16 is parallel to the propagation axis of the incident laser beam. The casing 16 is parallel-epipedal. The casing 16 may act as a frame for other elements of the guidance system 11. The casing 16 is opaque at least at the wavelength of the laser beam 15, and is preferably opaque over a wide range of wavelengths. The screen 18 is mounted parallel to the optical filter 17. The screen 18 is mounted at a distance from the optical filter 17 and at a distance from the camera 19. In one embodiment, the screen 18 is plane and made in one piece.

Figure 4:
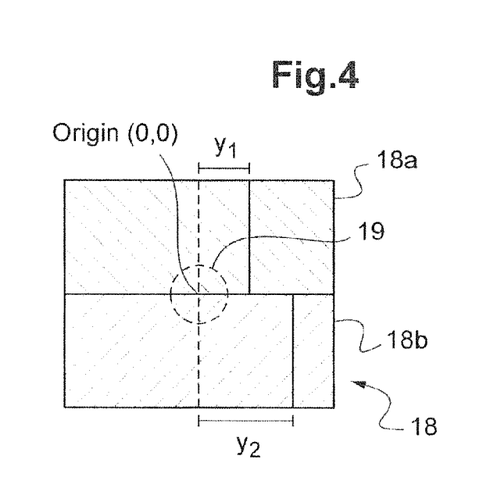
FIG. 4 shows schematically the guidance system, in a cross-sectional view.
Figure 5:
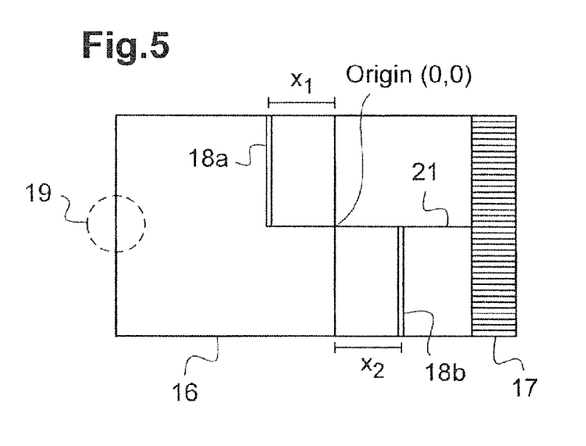
FIG. 5 shows schematically the guidance system, in a view in longitudinal section.

In the embodiment shown, the screen 18 is biplanar: see FIGS. 4 and 5. The screen 18 comprises two plane surfaces 18a, 18b, one being offset toward the optical filter 17 and one being offset toward the camera 19. The offset is $x_1$ in one direction and $x_2$ in the other direction, along the X axis. The arrangement may be such that $x_1=x_2$. The two plane parts 18a, 18b are parallel. The two plane parts 18a, 18b are complementary. The screen 18 is semi-opaque so as to allow light to pass through, while making the intersection of said screen and the laser beam visible. The screen 18 is made of acrylic or plexiglass. In FIG. 1, the screen 18 has been shown in two offset parts, as an exception to the overall top view.

The optical filter 17 (see FIG. 3) is designed to leave the light components parallel to the axis of the incident beam with a chosen aperture and eliminate the components that are oriented differently. The optical filter 17 is spatial. The optical filter 17 is a non-frequency filter. In the embodiment shown, the optical filter 17 comprises a honeycomb structure with through cells 20 oriented parallel to the axis. The cells 20 form parallel light transmission channels. The cells 20 may be hexagonal or rectangular. In the embodiment shown, the cells 20 are square, to allow economical manufacture. The embodiment with rectangular cells 20 is useful for discriminating the deviations in site and in azimuth. The optical filter 17 supplies at its output a directional light, from which most of the ambient light components have been eliminated.

Figure 3:
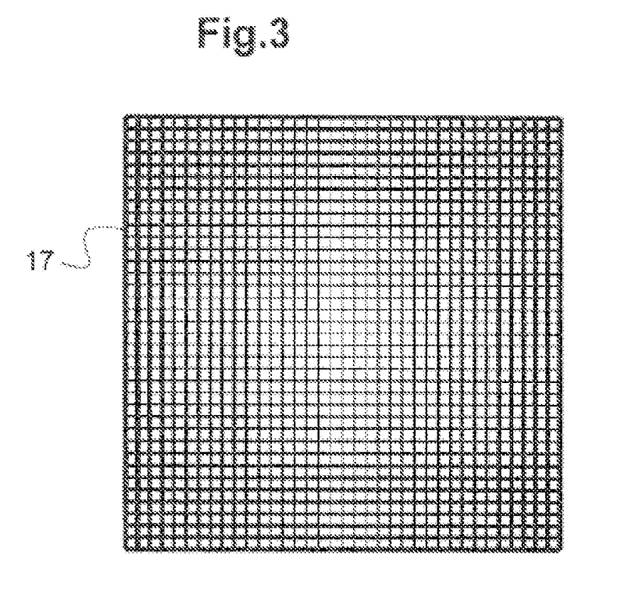
FIG. 3 shows schematically an optical filter seen by the camera.

The cells 20 are square in the embodiment shown, and are arranged in rows and columns. In FIG. 3, the optical filter 17 is seen from the axis of the camera, with a non-zero incidence angle outside the center. The cells 20 of the same size appear smaller at the edges because of the incidence.

The cells 20 have a width, depth and height that define the chosen angular aperture. The aperture may be between 5° and 100°, or preferably between 5° and 7°.

Figure 12:
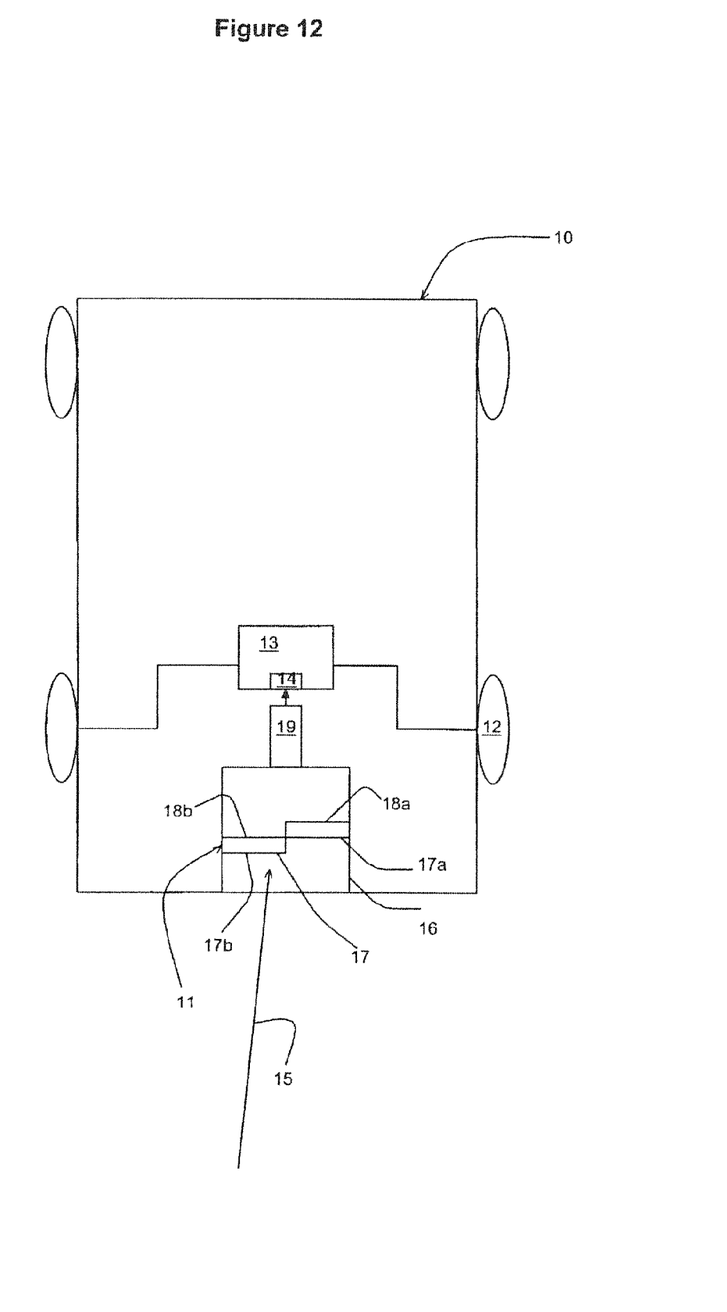
FIG. 12 shows schematically a machine with offset screen and filter.

In a preferred embodiment, the distance between the optical filter 17 and the screen 18 is zero: see FIG. 12. The screen 18 is adjacent to the optical filter 17. The screen 18 may be glued to the optical filter 17. The effects of diffraction in the filter are avoided. By way of example, there are two half-filters 17a, 17b, each glued to a respective part 18a, 18b of a screen. The half-filters are also offset: see FIG. 12. The two half-filters 17a, 17b have dimensions corresponding to the dimensions of the parts 18a, 18b of a screen.

The honeycomb structure is made of synthetic material which is molded or 3D printed. The color of the honeycomb structure is black. The cells 20 have a length of between 5 and 60 mm. The cells 20 have a width of between 2 and 15 mm. The honeycomb structure comprises inter-cell walls with a thickness of between 0.2 and 2 mm. A square arrangement facilitates manufacturing with a 3D printer. As shown in FIG. 5, an opaque partition 21 is arranged in the casing 16 to separate the parts 18a, 18b of screen 18. The opaque partition 21 runs through the axis of the casing 16. The opaque partition 21 extends from the optical filter 17 to the screen part farthest from the optical filter 17, in this case part 18a.

The camera 19 is a digital camera resolved into pixels. The resolution, which has been experimented, is 480×640. The results are satisfactory. The resolution is between 100,000 and 600,000 pixels, in order to remain in optimal operation. The camera 19 captures the image displayed on the screen 18, originating from the light penetrating into the casing 16 through the optical filter 17. Said filtered light comprises components of ambient light and of the incident laser beam 15, as long as the lateral deviation and the angular deviation of the casing 16 from the incident laser beam 15 remains limited. An output image of the camera 19 is reproduced in FIG. 9. The structure of the filter is visible here. An offset line between the upper and lower parts of the screen is observed here. This line is substantially of the same color as the laser beam. The width of the line depends on the distance to the laser and on the divergence of the beam. Beyond a certain distance from the laser transmitter, the thickness of the beam at the input of the optical filter may be comparable to, or even greater than, the width of a cell.

Figure 2:
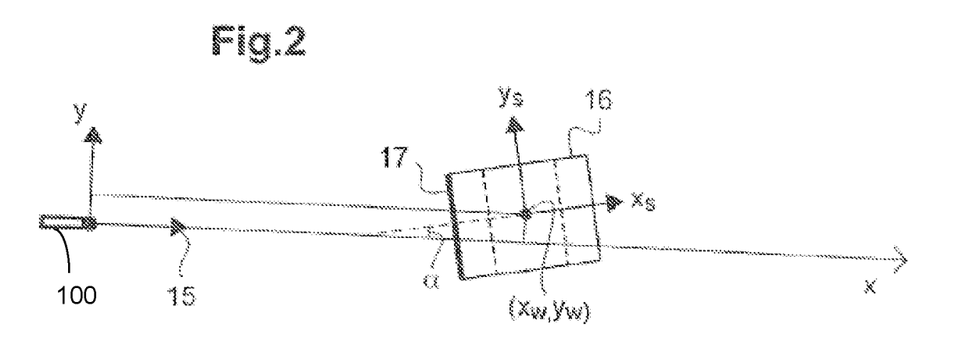
FIG. 2 shows schematically the alignment of the guidance system.

The lateral deviation limit is substantially equal to the half-width of the optical filter 17. The half-width of the optical filter 17 may correspond to the half-width of the casing 16. The angular deviation limit is substantially determined by the minimum of the width to depth ratio of the cells 20 and of the ratio of the half-width of the optical filter 17 to the distance between the optical filter 17 and the screen 18. In practice, the angular deviation limit is substantially determined by the shape ratio of the cells 20. In FIGS. 1 and 2, the laser beam 15 has been shown with a lateral and angular offset.

The distance between the camera 19 and the screen 18, notably the part of the screen 18 nearest to the camera 19, is chosen on the basis of the field of the camera 19, notably. The filtered light spatially illuminating the screen 18 is centered on the axis of the casing 16. The camera 19 supplies at its output a digital image, usually in three color channels, red, green and blue (abbreviated to RGB). The image capture frequency is between 10 Hz and 30 Hz.

The guidance system 11 (see FIG. 6) comprises a preprocessing member 30 which generates a detection response image, a line detector 40 which generates an estimate J of the coordinates of the detected lines, and a locator 50 which calculates a distance $y_w$ of the guidance system 11 from the plane laser beam 15 plane. The distance $y_w$ is sent as the output for controlling the steering mechanism 13 so as to minimize said distance $y_w$. A distance $y_w$ of zero signifies that the guidance system 11 is centered on the laser beam 15.

Figure 6:
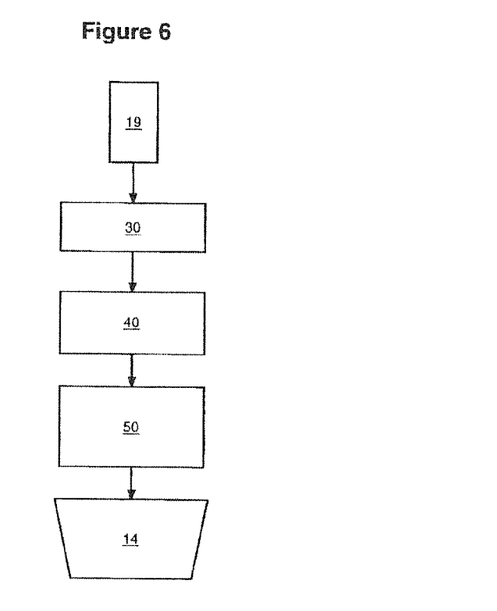
FIG. 6 is a functional diagram of the guidance system.

Advantageously, the locator 50 calculates an angular deviation α of the guidance system 11 from the plane laser beam 15. The angular deviation α is sent as the output for controlling the steering mechanism 13 so as to minimize said angular deviation α. An angular deviation α of zero signifies that the guidance system 11 is aligned on the laser beam 15. The calculation of the angular deviation α is based on differential data.

Figure 7:
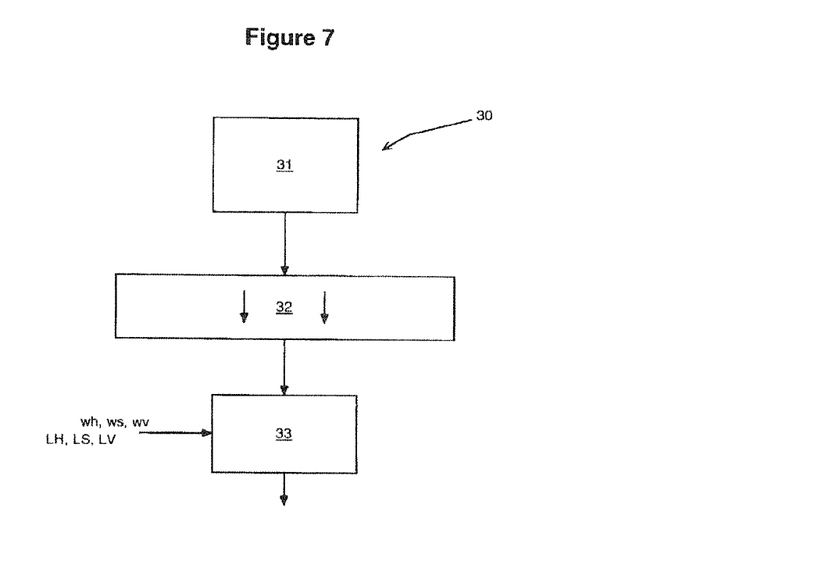
FIG. 7 is a functional diagram of the pre-processing member.

The pre-processing member 30 eliminates components of the image originating from anywhere other than the incident laser beam 15. The pre-processing member 30 comprises a red-green-blue primary colors to hue-saturation-value (HSV) converter 31, converting each pixel of the output image of the camera 19 into a pixel of an HSV image. The converter 31 may be a commercially available component. The hue is encoded on a color circle. The saturation is the intensity of the color. The value is the brilliance of the color, 0 being black. The converter 31 receives an image composed of RGB pixels and outputs an image composed of HSV pixels.

The pre-processing member 30 comprises an equalizer 32 using histogram equalization for each of the saturation and value channels of the HSV image. The histogram is applied independently for the saturation channel and the value channel:

$$T(x_k) = \frac{(L-1)}{n} \sum_{j=0}^{k} n_j$$

Where $T(x_k)$ is the output value of the pixels of level $x_k$, L is the number of levels of the channel concerned, n is the number of pixels in the image, and $n_j$ is the number of occurrences of pixels of level $x_j$.

The aim of applying histogram equalization is to maximize the contrast between the different values, thus facilitating classification in the subsequent steps. Since it is applied individually for each channel, the histogram is not the same from one channel to another. The equalization of the three channels may be carried out simultaneously. Hue equalization may introduce distortions in the color. In practice, the Applicant has found that the improvement in contrast is more important than this distortion. The equalizer has the same output for all the values of $x_k$ when the number of occurrences is the same for all the levels of the channel.

Said equalizer 32 receives the HSV image and supplies at its output an equalized HSV image providing improved contrast.

The pre-processing member 30 (see FIG. 7) comprises a calculator 33 for calculating an exponential function of the weighted Euclidean distance between an equalized HSV pixel and a reference pixel. The reference pixel may be a theoretical pixel corresponding to an area of the screen 18 that is entirely illuminated by the incident laser beam 15. Said calculator 33 receives the equalized HSV image from the equalizer 32. Said calculator 33 applies a negative exponential function of the sum per channel of the squares of the difference between the pixel of the equalized HSV image or equalized HSV pixel and the reference pixel:

$$O_{i,j} = e^{-(w_H(I^H_{i,j}-L^H)^2 + w_S(I^S_{i,j}-L^S)^2 + w_V(I^V_{i,j}-L^V)^2)}$$

where $O_{i,j}$ is the value of the pixel having coordinates i and j of the single-channel image forming the pre-processing output; $w_H$, $w_S$, $w_V$ are the weightings for the channels H, S, V; $I^H_{i,j}$, $I^S_{i,j}$, $I^V_{i,j}$ is the value of the input pixel in each channel; and $L^H$, $L^S$, $L^V$ is the value of the reference pixel in each canal. The reference pixel is common to the whole image. The weightings $w_H$, $w_S$, $w_V$ of the H, S, V channels are chosen on the basis of samples in which the laser has been projected into the device in realistic and diverse conditions, with the aim of covering a large number of operating situations. The values of the weights are greater than 0, and, since ambient light is much more saturated than laser light, the saturation is relevant information for the detection of the laser.

Figure 10:
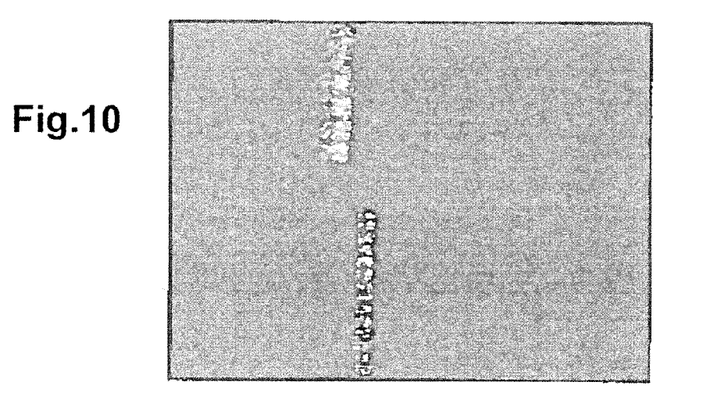
FIG. 10 is an output image of the pre-processing member.

The output image of the pre-processing member 30 is a detection response image O, shown in FIG. 10. Being a single-channel image, the detection response image O is in black and white. A high-contrast white streak is observed here. Since the machine has to operate in extreme lighting conditions, the response function has been calibrated to be highly sensitive; in the example, this results in a strong response in the pixels that are illuminated, even rather weakly, by the laser.

The detection response image O is a synthesis of the three HSV channels. The detection response image O is single-channel. Each pixel of said detection response image has a value which is a function of the probability that said pixel does or does not belong to the line of the laser beam 15.

In other words, the converter 31 can provide an image format more suitable for subsequent processing. The equalizer 32 improves the contrast. The calculator 33 makes it possible to assign to each pixel $O_{i,j}$ a value of 1 if the equalized HSV pixel $I_{i,j}$ is identical to the reference pixel and therefore has the same hue, the same saturation and the same value as an ideal pixel illuminated by the incident laser beam 15, and a very low value, $O_{i,j} = e^{-(w_H(L^H)^2 + w_S(LS)^2 + w_V(L^V)^2)}$, if the equalized HSV pixel $I_{i,j}$ is black. Thus, the output of the converter 31, forming the output of the pre-processing member 30, provides a detection response image representative of the areas illuminated by the incident laser beam 15. The pixels corresponding to the incident plane laser beam 15 received by the guidance system 11, filtered and projected on said screen 18, have been selected by the pre-processing.

Figure 8:
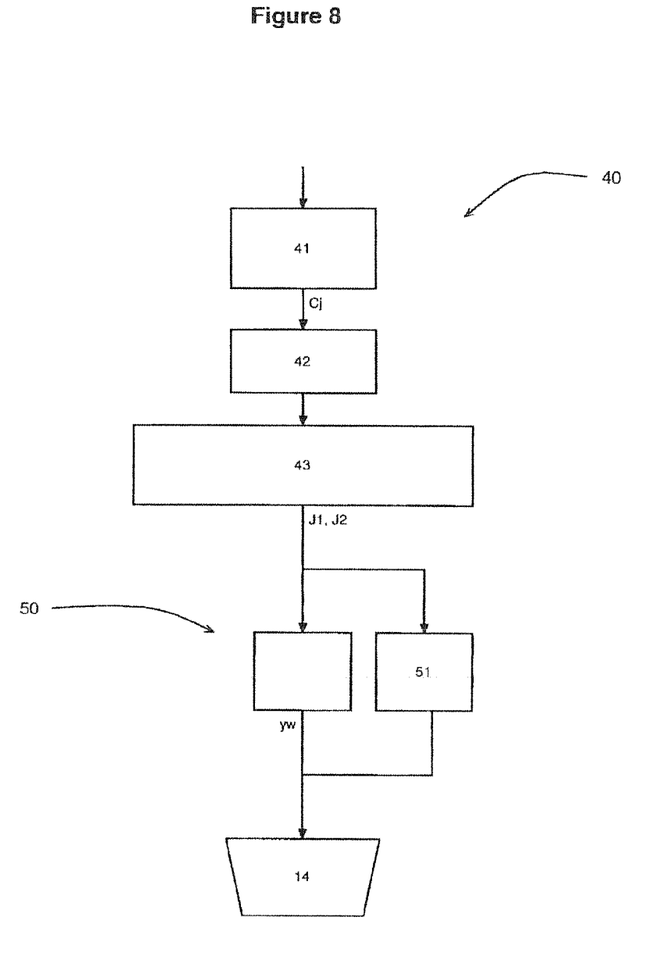
FIG. 8 is a functional diagram of the line detector and the locator.

The line detector 40 receives at its input the detection response image O comprising the pixels $O_{i,j}$. The value of the pixel $O_{i,j}$ is proportional to the probability that said pixel $O_{i,j}$ belongs to the light line projected by the incident laser beam 15 on the screen 18. The line detector 40 generates an estimate J of the coordinates (in column numbers) of the detected lines, on the basis of the detection response image O, by processing on the columns of pixels.

The line detector 40 (see FIG. 8) comprises a column adder 41, which adds up the pixels of each column of said detection response image to obtain a column parameter $C_j = \sum_i O_{i,j}$. The column parameter is representative of the proportion of presence of the light line projected by the incident laser beam 15 on the screen 18 in the column j.

The line detector 40 comprises a high-pass filter 42 receiving the column parameters $C_j$. The high-pass filter 42 eliminates the columns for which the parameter $C_j$ is too low. The high-pass filter 42 calculates the maximum $C_{max}$ of said column parameters $C_j$: $C_{max} = \max(C_j)$. The high-pass filter 42 applies a chosen filter coefficient τ. The filter coefficient z is constant. The high-pass filter 42 calculates the product $\tau C_{max}$ of the maximum $C_{max}$ and the filter coefficient z. The high-pass filter 42 eliminates the columns for which the parameter $C_j$ is less than the product $\tau C_{max}$. Thus the low-value columns that have a low probability of corresponding to an area of the screen 18 illuminated by the incident laser beam 15 are eliminated. The columns relevant to finding the position of the incident laser beam 15 on the screen 18 are selected.

The filtering is applied to the result of the classification. In a variant, the filtering is carried out at the same time as the classification. The filtering parameter is constant.

The above description of the line detector 40 makes a simplification by assuming that the detected lines originating from the incident laser beam 15 are vertical. If it is desired to allow for a relative inclination of the plane of the laser beam 15 and the plane of the pixel columns, it is possible to add an inclination estimator, for example one based on the least squares method.

The line detector 40 comprises a column weighting member 43. The weighting member 43 receives the columns selected by the high-pass filter 42 with their original index j attached. The column index j is retained. This is equivalent to accepting a discontinuity in all the indices of the selected columns. The knowledge of the position of each selected column in the HSV image is preserved. The knowledge of the column is translated into a coordinate of intersection between the laser and the screen.

The weighting member 43 sums the relevant column parameters $C_j$, weighted by their index j in the output image of the camera 19, i.e. $\Sigma_j jC_j$. The weighting member 43 sums the relevant column parameters $C_j$, i.e. $\Sigma_j C_j$. The weighting member 43 finds the ratio of the sum of the parameters weighted by their index j in the output image of the camera 19 to the sum of the parameters. The weighting member 43 supplies at its output the column index value J forming an estimate of the coordinates of the incident plane laser beam 15 in the output image of the camera 19: $J=\Sigma_j jC_j/\Sigma_j C_j$. The line detector 40 supplies on the basis on the detection response image an estimate of the coordinates of the incident plane laser beam 15 in the output image of the camera 19. J is between 1 and the number of columns of the output image of the camera 19.

The locator 50 receives said estimate J to calculate the distance $y_w$. The estimate J is proportional to the distance $y_w$. In the embodiment with a plane screen 18, the locator 50 calculates the distance $y_w$ by linear interpolation $y_w=mJ+b$. The parameter m is the distance between the screen 18 and the optical filter 17. The parameter b is representative of the centering of the screen 18. The parameters m and b are constants for a given machine. The parameters m and b may be calibration parameters which differ from one guidance system to another, or from one series of guidance systems to another.

In the embodiment with a screen 18 in two parallel parts 18a, 18b, the two parts 18a, 18b are high and low respectively. The locator 50 calculates the distance $y_w$ by linear interpolation on the basis of each part 18a, 18b of the screen 18. In the above procedure, a separation is performed to provide an estimate $J_1$ relating to the part 18a and an estimate $J_2$ relating to the part 18b. The parameters $m_1$ of distance between part 18a of the screen 18 and the optical filter 17, $b_1$ of centering of part 18a of the screen 18, $m_2$ of distance between part 18b of the screen 18 and the optical filter 17, and $b_2$ of centering of part 18b of the screen 18 are known from the structure of the guidance system 11. Generally, $b_1=b_2$.

The locator 50 performs the interpolations $y_1=m_1J_1+b_1$ and $y_2=m_2J_2+b_2$. $y_1$ and $y_2$ are the distances of the guidance system 11 from the plane laser beam 15 in part 18a and part 18b of the screen 18. The locator 50 finds the mean $y_w=$ $(y_1+y_2)/2$. The distance $y_w$ is a deviation in a horizontal plane between the center of the guidance system 11 and the plane laser beam 15.

Figure 9:
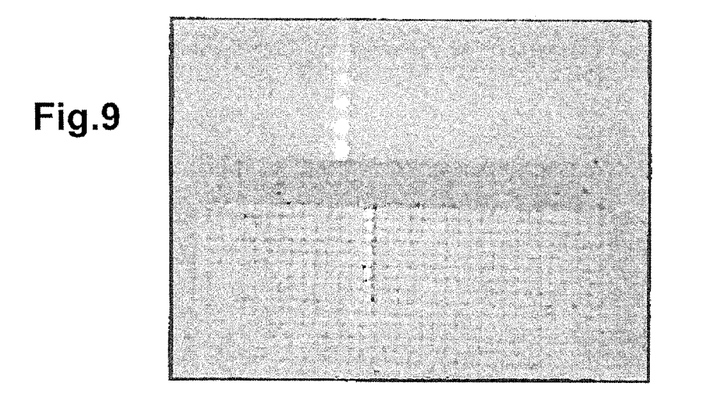
FIG. 9 is a camera output image.
Figure 11:
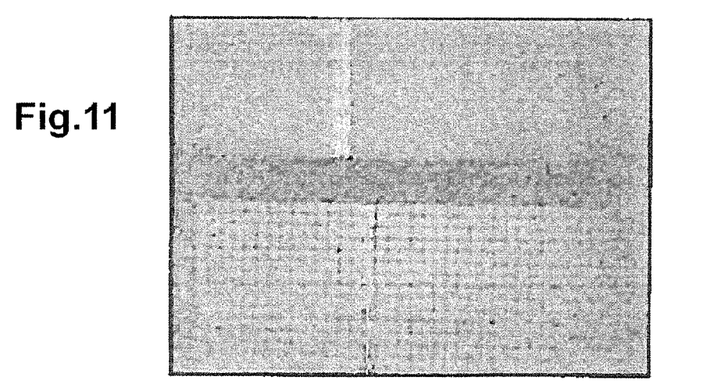
FIG. 11 is a superimposition of the camera output image and the detected line.

FIG. 11 shows, in superimposition, the image of FIG. 9 and two vertical half-lines with coordinates $y_1$ and $y_2$. The coordinates $y_1$ and $y_2$ correspond precisely to the positions of the laser beam illuminating the two parts of the screen.

In the embodiment with a screen 18 in two parallel parts 18a, 18b, the locator 50 comprises a calculator 51 of the angle α between the plane of the laser beam 15 and the axis of the guidance system 11, where $α=Atan\ 2(y_2-y_1; x_1+x_2)$, said axis being normal to each part of the screen 18. The sum $x_1+x_2$ is the distance between the two parts 18a, 18b of the screen 18: see FIG. 5. The difference $y_2-y_1$ is the distance between the plane laser beam 15 in part 1 of the screen 18 and the plane laser beam 15 in part 2 of the screen 18: see FIG. 4. The angle α is the angular deviation of the axis of the guidance system 11 from the laser beam 15 in a horizontal plane: see FIG. 2. Knowledge of the angle α enables a more effective correction to be made. It is assumed that the vertical axis of the sensor and that of the laser are aligned. In practice, there will be differences, and the angle obtained is an approximation of the actual angle.

By way of example, a large angle α and a zero distance $y_w$ signify that the machine is centered on the guiding laser beam but is misaligned. In the plane screen embodiment, no correction is made because the zero distance $y_w$ is satisfactory, except for appropriate adjustments of the proportional and derivative modes of the correction. The derivative $y'_w$ may provide relevant information, but this is less precise than the angle α. In the embodiment with offset partial screens, the high angle α enables a correction to be made immediately, for example from the start of a cultivation row when the machine has just crossed the guiding laser beam and the guidance system sends output information indicative of centering and misalignment.

The invention also proposes a guidance assembly comprising the guidance system 11 described above and at least one appropriate laser transmitter.

The invention claimed is:

1. An autonomously guided machine which comprises at least a steering member and a steering mechanism, wherein the machine further comprises a guidance system including an optical filter which has a receiving face exposed to the exterior and which transmits light rays directed substantially in one direction and eliminates other light rays; a screen receiving the filtered light; a digital camera to capture images resolved into pixels of said screen; a pre-processing member that selects the pixels corresponding to an incident plane laser beam received by the guidance system, filtered and projected onto said screen, and can generates a detection response image; a line detector generating, on the basis of the detection response image, by processing on the columns of pixels, an estimate J of the coordinates of the detected lines; and a locator that receives the estimate of the coordinates of the detected lines and calculates values representative of columns of pixels on the basis of said estimate of the coordinates of the detected lines and parameters of the guidance system, and then calculates a distance $y_w$ of the guidance system from the plane laser beam in order to control the steering mechanism to minimize said distance $y_w$.

2. The machine according to claim 1, wherein the optical filter comprises a honeycomb structure with through cells, to transmit the light rays along the axis of the through cells.

3. The machine according to claim 1, wherein the detection response image is single-channel, and each pixel of said detection response image has a value which is a function of a probability that said pixel belongs to the line of the laser beam.

4. The machine according to claim 1, wherein the pre-processing member comprises a red-green-blue primary colors to hue-saturation-value (HSV) converter, which converts each pixel of the output image of the camera into a pixel of an HSV image, an equalizer for each of the saturation and value channels of the HSV image, and a calculator of an exponential function of the weighted Euclidian distance between an HSV pixel and a reference pixel:

$$O_{i,j}=e-(w_H(I^H_{i,j}-L^H)^2+w_S(I^S_{i,j}-L^S)^2+w_V(I^V_{i,j}-L^V)^2)$$

where $O_{i,j}$ is the value of the pixel having coordinates i and j of the single-channel image forming the pre-processing output; $w_H$, $w_S$, $w_V$ are the weightings for the channels H, S, V; $I^H_{i,j}$, $I^S_{i,j}$, $I^V_{i,j}$ is the value of the input pixel in each channel; and $L^H$, $L^S$, $L^V$ is the value of the reference pixel in each canal.

5. The machine according to claim 1, wherein the locator comprises a calculator of the distance $y_w$ of the guidance system from the plane laser beam as a function of the estimate J of the coordinates of the detected lines, of a parameter m of distance between the screen and the optical filter, and of a parameter b of centering of the screen, where $y_w$=m J+b.

6. The machine according to claim 1, wherein the screen is adjacent to the optical filter.

7. The machine according to claim 1, wherein the screen comprises two parallel parts, spaced apart in the direction of propagation of the incident laser beam, and the locator calculates an angular deviation α of the guidance system from the plane laser beam in order to control the steering mechanism.

8. The machine according to claim 7, wherein the locator, after the calculation of the values representative of columns of pixels, calculates the angular deviation α of the guidance system from the plane laser beam in order to control the steering mechanism to minimize said distance $y_w$.

9. The machine according to claim 8, wherein the locator comprises a calculator of the angle between the plane of the laser beam and the axis of the guidance system, where α=Atan2($y_2-y_1$; $x_1+x_2$), said axis being normal to each part of the screen.

10. A machine guidance assembly comprising a movable guidance system a stationary plane laser beam transmitter, the guidance system including an optical filter which has a receiving face exposed to the exterior and which transmits light rays directed substantially in one direction and eliminates other light rays; a screen receiving the filtered light; a digital camera to capture images resolved into pixels of said screen; a pre-processing member that selects the pixels corresponding to an incident plane laser beam received by the guidance system, filtered and projected onto said screen, and generates a detection response image; a line detector generating, on the basis of the detection response image, by processing on the columns of pixels, an estimate J of the coordinates of the detected lines; and a locator that receives the estimate of the coordinates of the detected lines and calculates values representative of columns of pixels on the basis of said estimate of the coordinates of the detected lines and parameters of the guidance system, and then calculates a distance $y_w$ of the guidance system from the plane laser beam in order to generate a control signal to minimize said distance $y_w$.

* * * * *